(12) United States Patent
Stadius et al.

(10) Patent No.: US 10,083,680 B2
(45) Date of Patent: Sep. 25, 2018

(54) MIXING CONSOLE

(71) Applicant: Digico (UK) Ltd, Surrey (GB)

(72) Inventors: John Stadius, Surrey (GB); Roger Wood, Surrey (GB)

(73) Assignee: Digico Ltd. (GB)

( * ) Notice: Subject to any disclaimer, the term of this patent is extended or adjusted under 35 U.S.C. 154(b) by 0 days.

(21) Appl. No.: 15/526,742

(22) PCT Filed: Nov. 13, 2015

(86) PCT No.: PCT/GB2015/053460
§ 371 (c)(1),
(2) Date: May 12, 2017

(87) PCT Pub. No.: WO2016/075489
PCT Pub. Date: May 19, 2016

(65) Prior Publication Data
US 2017/0337914 A1  Nov. 23, 2017

(30) Foreign Application Priority Data
Nov. 14, 2014  (GB) .................................. 1420286.5

(51) Int. Cl.
*G10H 1/00* (2006.01)
*G10H 1/46* (2006.01)
(Continued)

(52) U.S. Cl.
CPC .............. *G10H 1/46* (2013.01); *H04H 60/04* (2013.01); *G11B 27/022* (2013.01); *G11B 27/031* (2013.01)

(58) Field of Classification Search
CPC ..... G11B 27/022; G11B 27/031; H04H 60/04
(Continued)

(56) References Cited

U.S. PATENT DOCUMENTS

| | | | |
|---|---|---|---|
| 6,782,108 B2 * | 8/2004 | Shibata ................. | H04H 60/04 381/119 |
| 7,936,889 B2 * | 5/2011 | Aiso ..................... | H04H 60/04 369/4 |

(Continued)

FOREIGN PATENT DOCUMENTS

DE    20 2005 000536 U1    5/2005

OTHER PUBLICATIONS

United Kingdom Intellectual Property Office (UKIPO), Patents Act 1977: Combined Search and Examination Report Under Sections 17 and 18(3), Great Britain Patent Application Serial No. GB1420286.5 (1420286.5), dated May 22, 2015.

(Continued)

*Primary Examiner* — Disler Paul
(74) *Attorney, Agent, or Firm* — Reichel Stohry LLP; Natalie J. Dean; Mark C. Reichel

(57) ABSTRACT

In live music performances each musician may prefer to receive a customized signal comprising one or more signals including their own output and/or other musicians' output. This is achievable by providing a mixing console for receiving and processing input signals comprising receiving means for receiving at least two input signals and operating so as to process (205, 255) them simultaneously in different ways to create at least three first and at least three second output signals, further processing (210, 215, 260, 265) at least two of the at least three first and at least three second output signals to create tertiary output signals each tertiary output signal having characteristics, other than its gain, different from one another, combining and processing (280) at least two tertiary output signals to create a first auxiliary output mix, and combining and processing (290) at least two other tertiary output signals to create a second auxiliary output (Continued)

mix, and combining and processing (300) a first and second output signal to create a master output mix.

15 Claims, 2 Drawing Sheets

(51) Int. Cl.
  *H04H 60/04* (2008.01)
  *G11B 27/031* (2006.01)
  *G11B 27/022* (2006.01)

(58) Field of Classification Search
  USPC .......................................... 381/119, 109, 103
  See application file for complete search history.

(56) References Cited

U.S. PATENT DOCUMENTS

| | | | | |
|---|---|---|---|---|
| 8,119,900 | B2* | 2/2012 | Skillings | G10H 1/0058 84/634 |
| 9,767,778 | B2* | 9/2017 | Skillings | G10H 1/18 |
| 2003/0059066 | A1 | 3/2003 | Kohyama et al. | |
| 2006/0268972 | A1* | 11/2006 | Wu | H04L 1/0631 375/229 |
| 2009/0282967 | A1 | 11/2009 | Skillings | |

OTHER PUBLICATIONS https://www.soundonsound.com/sos/dec05/articles/live_stagemonitoring.htm, See 'Mixng monitors from the FOH console', Archived version dated Sep. 14, 2014 available from https://web.archive.org/web/20140914065526/http://www.soundonsound.com/sos/dec05/articles/live_stagemonitoring.htm.

http://en.wikipedia.org/wiki/Stage_monitor_system, See section '2.2 Monitors Mixed from Front of House', Archived version dated Sep. 16, 2013 available from https://web.archive.org/web/20130916010815/http://en.wikipedia.org/wiki/Stage_monitor_system.

Yamaha PM3000 user manual, http://www.stagesoundandlighting.com/PDF/Yamaha%20Pm-3000.pdf, See e.g. page 1-1, 2nd paragraph. The Yamaha PM3000 was released in 1985—see http://www.yamaha.co.jp,manual/english/chron_pa.php.

International Searching Authority, International Search Report, PCT Patent Application Serial No. PCT/GB2015/053460, dated Feb. 25, 2016.

International Searching Authority, Written Opinion of the International Searching Authority, PCT Patent Application Serial No. PCT/GB2015/053460, dated Feb. 25, 2016.

United Kingdom Intellectual Property Office (UKIPO), Patents Act 1977: Examination Report under Section 18(3), Great Britain Patent Application Serial No. GB1420286.5 (1420286.5), dated Dec. 8, 2017.

* cited by examiner

MIXING CONSOLE

PRIORITY

The present application is related to, and claims the priority benefit of, and is a 35 U.S.C. 371 national stage application of, International Patent Application Serial No. PCT/GB2015/053460, filed Nov. 13, 2015, which is related to, and claims the priority benefit of, Great Britain Patent Application Serial No. 1420286.5, filed Nov. 14, 2014. The contents of each of these applications are hereby incorporated by reference in their entirety into this disclosure.

TECHNICAL FIELD

The present invention relates generally to a mixing console and a method of using the console, and finds particular, although not exclusive, utility in audio mixing, and in live music mixing.

BACKGROUND

Typically, a mixing console (also known as an audio mixer, mixing desk, audio production console and soundboard) is a device for processing (also known as mixing or summing) audio signals. However, they may also be used for processing video signals as well as or instead of audio signals.

Mixing consoles are used extensively in the entertainment industry, and have many applications, e.g. in recording studios, sound reinforcement systems, public address systems, broadcasting, radio, television, film post-production, and at live concerts.

In use, a mixing console may be provided with at least two audio input signals, each signal being directed to an input channel of the console. The input signals may be analogue or digital. The mixing console may be able to combine those input signals together to produce a combined output signal delivered via an output channel. A mixing console may also apply one or more pre mixing (initial) processes to an input signal prior to mixing with any other input signals or channels. Also, the mixing console may apply one or more post-mixing processes to the combined output signal. The mixing console has means to direct the combined output signal to an output source, such as an amplifier, speaker, monitor or a recording device. When an output signal is transmitted to an audience, this signal is often known as the "master output mix". The term 'audience' is intended to refer to anyone (or anything, such as a recording device) that is intended to receive the main output signal, but is not generally actively involved in the creation/production of the input signals and/or operation of the mixing console.

However, the mixing console may also provide an output signal that is not intended for an audience, but is instead intended for one or more reviewers (e.g. one or more performers, musicians, singers etc. and/or console users). This may be directed to a monitor speaker and/or headphones. Such an output signal is often known as the "auxiliary output mix". This is useful, for example, where one performer wants to be able to hear one of the other performers more clearly.

Each auxiliary output mix may comprise a combination of one or more input signals. Each input signal may have been initially processed before being combined with another of the input signals. The gain of each initially processed input signal may be manipulated before being combined with other such processed and manipulated input signals. The combined signal may also be processed again before being transmitted as the auxiliary output mix. It is possible to create more than one auxiliary output mix each having a different combination of input signals by the manipulation of the gain of each source input signal. However, each auxiliary output mix, including a particular input signal, will include that particular input signal in the same form, other than its gain, as the other auxiliary output mixes including that particular input signal.

The further processing of each combination of input signals prior to transmittal as the auxiliary output mixes may be different but the characteristics of each constituent input signal are all the same, other than their gain.

For example, a mixing console would allow audio signals which originate from three performers (e.g. a singer, a drummer and guitarist) to be mixed together and heard through a set of speakers, the speakers transmitting the master output mix to an audience. The mixing console may have an input means to receive each performer's audio signal (e.g. via microphones, pick-ups and the like, connected to (or part of) the mixing console). The console user (typically a sound engineer, sound technician, performer or other operator) may amend the guitarist's input signal by applying a process to it, and may reduce the gain on the drummer's input signal. He may leave the singer's input signal unchanged. He may then combine the three input signals amended as discussed. The resulting combination may then be processed again to provide a master output mix. Simultaneously, the console may be used to combine two or more input signals, amended as described above, and processed again to provide an auxiliary output mix. More than one auxiliary output mix may be created each having a different combination of input signals (i.e. performers' signals). However, each auxiliary output mix, and the master output mix, will have used the same initially amended input signals as each other.

The auxiliary output mixes may be sent to each performer to aid their performance. However each performer may wish to have each input signal from each performer processed in a particular and different manner from each other performer. For instance, the singer may wish to have the low notes from the drummer removed or reduced in intensity as they interfere with their singing. However, the guitarist may like to hear the drummer's output including the low notes. Present mixing consoles do not allow for this individualisation of the auxiliary output mixes without splitting the input signals into separate channels. If the input signals are split in this way then each split input signal will require separate initial processing and create a plethora of channels. This has the disadvantage of creating many more channels which become cumbersome for the operator to manage and which increases processor requirements leading to larger and more costly consoles.

It is desirable therefore to have a mixing console which provides greater flexibility with the processing of each input signal to create a greater variety of auxiliary output mixes.

BRIEF SUMMARY

According to a first aspect, the invention provides a mixing console comprising:

first and second input channels each input channel comprising receiving means arranged to receive a unique input signal;

the first input channel comprising a first primary processing means for initially processing the input signal and arranged to provide at least three first identical output signals;

the second input channel comprising a second primary processing means for initially processing the input signal and arranged to provide at least three second identical output signals;

the console further comprising at least three output channels;

the first output channel comprising at least a first and second secondary processing means, the first secondary processing means arranged to process the first output signal from the first input channel and produce a first tertiary output signal;

the second secondary processing means arranged to process the first output signal from the second input channel and produce a second tertiary output signal;

the second output channel comprising at least a third and fourth secondary processing means, the third secondary processing means arranged to process the second output signal from the first input channel and produce a third tertiary output signal;

the fourth secondary processing means arranged to process the second output signal from the second input channel and produce a fourth tertiary output signal;

each output channel comprising a tertiary processing means, the tertiary processing means in the first output channel being arranged to combine and process the first and second tertiary output signals to produce a first auxiliary output mix;

the tertiary processing means in the second output channel being arranged to combine and process the third and fourth tertiary output signals to produce a second auxiliary output mix; and the tertiary processing means in the third output channel being arranged to combine and process the third output from the first input channel and the third output from the second input channel to produce a master output mix;

wherein characteristics of the master output mix, the first auxiliary output mix and the second auxiliary output mix are all different from one another.

For the purposes of this specification the 'characteristics' of any signal, mix or output, relate to how the signal, mix or output, sounds as an audio output. For instance, a characteristic may be any one or more of frequency, amplitude, bass, treble, pitch, quality, harmonic, overtone, reverberation, echo, wave shape, background noise, pressure, intensity, direction, dynamics, equalisation, tone and timbre.

Further output channels may be provided each to produce an additional auxiliary output mix, each auxiliary output mix possibly having characteristics different from one another and each possibly including a different mix of input signals. In this way, each performer may have an individual auxiliary output mix directed at them.

The primary processing means may allow for the dynamics and/or equalisation of the input signals to be altered prior to being further processed by the secondary processing means. This allows for a particular input signal to be processed centrally, prior to further processing in different ways as required for each output channel. For instance, the removal of an undesirable characteristic could be achieved centrally in this manner thus avoiding it having to be removed individually for each output channel at the secondary and/or tertiary processing stage.

Any, or all, of the secondary processing means may be arranged for processing the gain and other characteristics of the first and/or second output signals.

The primary processing means may be arranged to process any of the characteristics of the input signals other than their gain.

The tertiary processing means may be arranged to process any of the characteristics of the tertiary output signals including their gain.

The phrase "any of the characteristics . . . other than their gain" means that a particular characteristic of one signal has different properties from the same characteristic of another signal. The characteristic in question is not its gain. Whether the gain is the same or different in the two signals may be irrelevant.

The third output channel may further comprise controls for adjusting the gain of the third output from the first input channel and the third output from the second input channel prior to their being combined and processed by the tertiary processing means.

The gain may be reduced to zero thus effectively omitting a particular signal from inclusion into the master output mix. Alternatively or additionally, the controls may include a switch to switch-off a particular signal so as not to include it in the master output mix.

The controls for adjusting the gain of the third output from the first input channel and the third output from the second input channel, prior to their being combined and processed by the tertiary processing means, may also include fifth secondary processing means for processing the third output from the first input channel and sixth secondary processing means for processing the third output from the second input channel.

In this way each first and second output signal may be individually processed prior to being combined and processed by the tertiary processing means. This provides additional flexibility in the overall system.

Any or all of the processing means may be provided by a set of processors, comprising one or more processors. In this regard, the term "processor" may mean a silicon chip and a set of processors may be one or more silicon chips. The set of processors may also comprise the combining means.

The mixing console may further comprise manually operable controls for controlling the processing and combining of the input signal(s) and for directing the master output mix and auxiliary output mix to different destinations.

Such controls may include knobs, sliders, faders, switches, touch sensitive screens and the like.

The manually operable controls may be for controlling the combining of the more than one input signal. The user may thus be able to combine different combinations of input signals to create individual auxiliary output mixes.

The mixing console may further comprise a memory for storing and recalling the settings of the manually operable controls. In this way, the mixing console may be used to store configurations for various auxiliary output mixes and/or output channels for each song, or scene in a performance. This may be determined during rehearsals and/or sound-checks. Then during the actual performance the user may recall these settings and apply them to the input signals and output channels in order to create the various auxiliary output mixes and master output mix quickly.

The memory may be arranged to store more than one set of settings. The memory may comprise flash memory, hard disc drives and other such digital storage types.

The mixing console may further comprise indicator means. These indicator means may be used to alert the user to the present settings such as the equalisation of an input signal, which input signals are being combined, the destination of an identified auxiliary output mix and other aspects.

The indicator means may comprise visual indicators and/or audio indicators. The indicator means may comprise one or more of a light, LED, VDU, headphones, speaker, monitor, whistle, bell and chime.

The input signals may comprise one or more of an instrument, vocals, a sample, a recording and other sound sources.

The console may permit each auxiliary output mix and the master output mix to be individually customised as desired. For example, the input signals may be individually (i.e. separately) and independently manipulated, and the resultant signals to be also independently manipulated to create output mixes. A user may be able to control the manipulation of a single output mix/channel in this way. It should be noted that any processes being applied to one auxiliary output, or master output, mix may be independent of any processes being applied to create another auxiliary output mix, and the master output mix.

For example, singers in a duet may each wish to receive an auxiliary output mix that has been processed so as to be customised to their particular need. Being able to customise each auxiliary output mix according to each performer's need, gives each performer the opportunity to give a better performance (for example to remove aspects of the master output mix which they find distracting). Presently, in the prior art, this is only possible if a separate mixing console is provided for each performer or destination. As the number of artists performing increases, the number of mixing consoles required likewise increases, as does the number of console operators. Having more consoles is an additional expense, and these would require more space, which is often very limited at a performing venue.

The input signals are typically audio signals. In a mixing console, each signal sent to the console will have its own input channel. An input channel is a stream of information which may be processed and/or routed (transmitted, directed) to various parts of the console. The stream of information may be combined with other streams of information from other input channels, and further processed to provide an output signal. The information may for example be audio data, and in particular digital audio data. For example, a microphone will receive and convert sound waves into information, and the information may be provided to a channel at the mixing console. Likewise, an instrument such as an electric guitar may provide audio information to a channel of a mixing console. Each channel may be processed individually (i.e. separately) by the console, or these separate channels may be combined into a new combined channel which is then processed by the console. Channels may contain stereo or monaural information. Channels may have XLR, RCA, quarter-inch TRS connectors. Channels may include full mono or stereo channels and/or assignable busses. A mixing console may contain as few as two input and output channels, or as many as the processor engine allows, e.g. in excess of 2,000. For example, a mixing console could provide up to 96 channels, for example, where 12 channels may be full mono or stereo channels and 48 channels may be assignable busses. Auxiliary output mix channels can be provided to one or more reviewers (e.g. the console user and/or a performer). The console of the invention may provide the auxiliary output channel with one or more processing means (e.g. an auxiliary output mix processing means).

The auxiliary output mix and/or master output mix may be for being sent to a sound and/or video system.

The reviewer is independently selected from the group including: performer, console user, and electronic analysing means. The reviewer may independently apply one or more processes as discussed further herein. The mixing console may provide the reviewer with feedback means. The feedback means may be independently selected from visual feedback and/or audio feedback means.

The processing means may be used to adjust, alter and control, or in some way manipulate the signal on which the processing means operates, and in that way change the nature/form/characteristic of that signal.

Processes that are contemplated include processes such as summing signals together, which may be done by a dedicated summing amplifier, or in the case of digital signals by an algorithm (this process is often referred to as mixing). Other processes may be achieved by faders (e.g. to attenuate/boost the level of signals); pan pots (e.g. to transmit signal to left or right, and in surround systems also to the back and front); equalizers (e.g. to manipulate the frequency of signals, such as high-pass, low-pass, band-pass, shelf and notch filters); compressors (e.g. to attenuate signals above a certain dynamic threshold); gates (e.g. to attenuate signals that fall below a certain dynamic threshold); reverbs (e.g. to simulate boundary reflections created in a room); delays (e.g. to add echoes). Dynamic processes contemplated may be used, for example even out the level fluctuations of a vocal or bass track and/or reshape the dynamic envelopes of instruments. Processes can be triggered by sources other than the target channel e.g. by using the sidechain input. Other processes contemplated may include valve emulation, single and multi-channel presets, dual insert points, Hi- and Lo-pass filters @ 24 dB/octave, parametric EQ with band curve selection and dynamic EQ on each band, and delay. A "process" or the "processing" of signals therefore may not be restricted to, and indeed may not include, manipulation of a signal's gain.

The processors may be configured to be able to independently, or in combination, apply processes selected from the group including: attenuation; band curve selection; band-pass equalization; boosting; compression; delaying; valve emulation; dual insert points; dynamic equalisation; dynamic reshaping; echoing; equalization; fading; four-band parametric equalization; gating; high-pass equalization; high-pass filtration; level fluctuating; levelling; low-pass filtering; low-pass equalization; mixing; notch filter equalization; panning; reshaping; reverberation; shelf equalization; single and multi-channel pre-setting; and summing.

In one example, the mixing console may be equipped with various physical and electronic controls (e.g. knobs, buttons, sliders, ports, switches, touch pads, keyboards, mice and light pens), which allow the console user to manipulate the console and signals, and to apply various processes, receive, transmit and mix channels.

It is contemplated that the mixing console may have software features such as an auto update option, and may have means to aid cue programming, provide channel alias options and/or matrix nodal delays.

It is contemplated that the receiving means of the mixing console provides various ways in which the input signals may be provided to the various input channels of the mixing console, these receiving means being independently selected from the group including one or more of ports, plugs, sockets, connectors, wires, cables and by wireless connection.

The memory may provide various ways in which the process settings of the mixing console may be varied, stored, recovered and/or applied to the various channels of the mixing console. These means for storing and recalling may be independently selected from the group including one or more of saving means, processing means, recalling means, transferring means, computer processing means, algorithm means, hard drives, solid state memory, computer processor, any of which may be internal and/or external to the mixing console. When external, these may be connected via a wired connection, or via a wireless connection, and/or may be accessed via internet, mobile, or satellite connection, or which are in the cloud, or take place in the cloud.

In a second aspect, the invention provides a method of processing input signals comprising the steps of providing a mixing console according to the first aspect, providing at least two input signals, and processing them simultaneously in different ways to create at least two first and at least two second output signals, further processing the at least two first and at least two second output signals to create tertiary output signals each tertiary output signal having characteristics, other than its gain, different from one another, and combining and processing at least two tertiary output signals to create a master output mix, and combining and processing at least two other tertiary output signals to create an auxiliary output mix.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION

Figure 1:
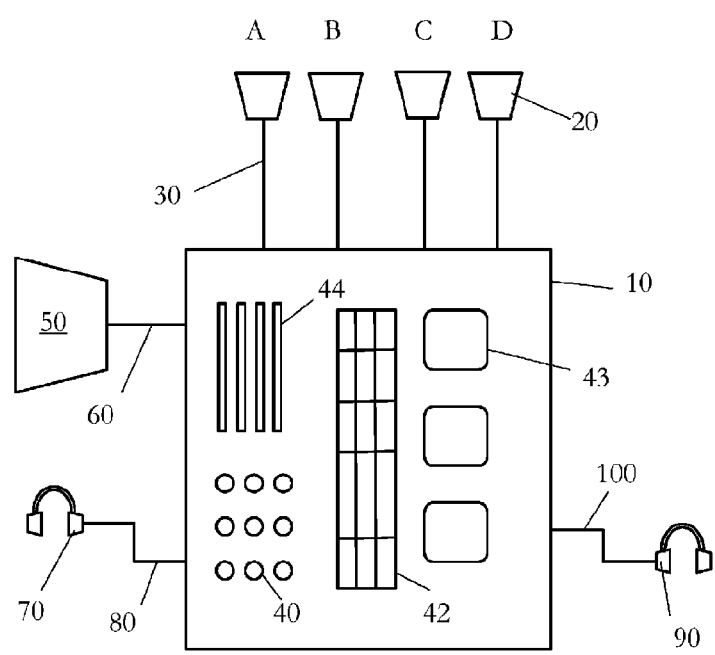
FIG. 1 is a schematic representation of a mixing console in use.

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "connected", used in the description, should not be interpreted as being restricted to direct connections only. Thus, the scope of the expression "a device A connected to a device B" should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any embodiment or aspect of the invention may be combined in any suitable manner, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments may be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances.

The principles of the invention will now be described by a detailed description of at least one drawing relating to exemplary features of the invention. It is clear that other arrangements may be configured according to the knowledge of persons skilled in the art without departing from the underlying concept or technical teaching of the invention, the invention being limited only by the terms of the appended claims.

FIG. 1 is a schematic drawing of a mixing console 10. In this example, the mixing console is for receiving sound signals from performers and for processing those signals to provide an master output mix for the audience and auxiliary mix signals for at least one performer.

The sound sources are referenced "A", "B", "C" and "D". The sounds are received by microphones 20. These microphones are connected to the mixing console 10 by cables 30.

The console includes various controls 40, 42, 43, 44 for controlling its operation. For instance, a first set of controls may allow the console to process and/or combine a selected input signal from sources A, B, C, D or a group of selected input signals in a first manner. A second set of controls may allow the input signals from sources A, B, C, D to be processed and combined in a different manner.

A master mix output is transmitted via cable 60 to loudspeakers 50. This may be the combination of the input signals from sources A, B, C, D processed to provide an optimum output as determined by the operator of the console.

A pair of headphones 70 is also connected to the console 10 by another cable 80. These headphones may be worn by one of the performers. They may receive a first auxiliary mix output from the console 10 which is a combination of only three of the four input signals from sources B, C, D. This combination may also include processing which is different from the processing creating the master output mix.

Another pair of headphones 90 is also connected to the console 10 by another cable 100. These headphones may be worn by another of the performers. They may receive a second auxiliary mix from the console 10 which is a combination of all four input source signals A, B, C, D. However, the processing is different from the processing creating the master output mix and the first auxiliary mix. In this example the processing is reducing the bass of one of the performer's output signals and changing the dynamic range of another of the performer's output signals.

Although only two auxiliary mix outputs are shown the console 10 is capable of providing many more, each including a different or similar combination of input signals and different to similar processing applied thereto.

Figure 2:
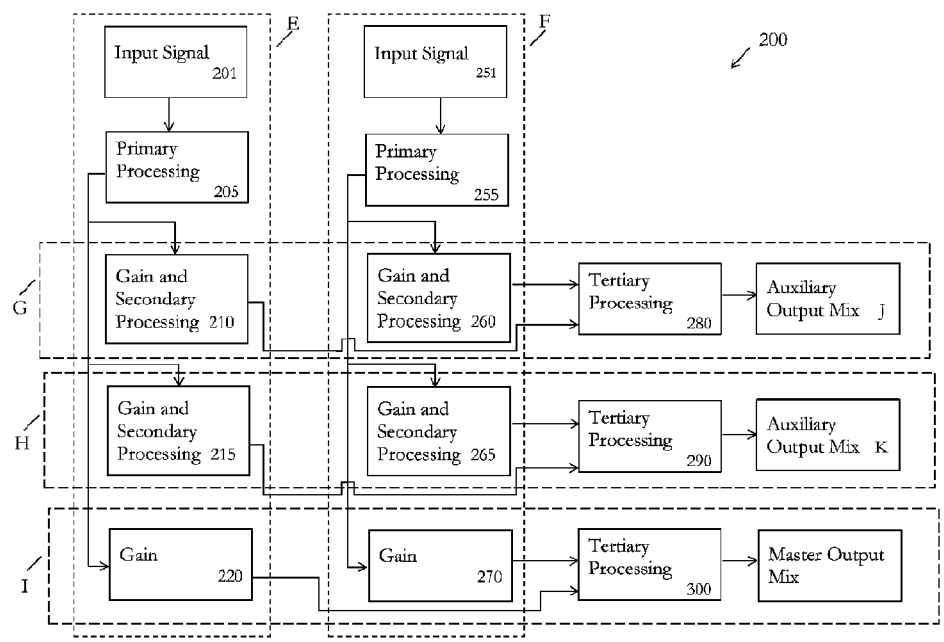
FIG. 2 is a flow diagram indicating the processing steps in a mixing console.

In FIG. 2 a flow of processing steps is indicated 200; the arrows indicating the direction of flow of the signals through the console.

Two input channels E, F are identified each as a column of steps. Three output channels G, H, I are also identified each as a row of steps.

In input channel E a first input signal 201 is shown. This may be the output from a performer. In input channel F a second input signal 251 is shown. This may be the output from another different performer. The signals 201, 251 are input to the console.

The first input signal 201 is then processed in an initial processing step 205. Likewise, the second input signal 251 is processed by an initial processing step 255. These processing steps 205, 255 provide a central, over-arching processing of these signals prior to further processing and/or combining. This initial processing may be effected by primary processing means.

The output from the initial processing step 205 is shown split into three identical signals or outputs. Many more than three identical signals are contemplated. A first one of these signals is then processed again 210 in a secondary processing means. It may also have its gain manipulated. A second one of these is then processed again 215 in a secondary processing means. It may also have its gain manipulated.

Finally, one of the identical signals has only its gain manipulated in step 220.

Each of these three identical signals are used in a separate output channel G, H, I.

The above is then repeated with respect to the second input signal 251 such that after it has been primarily processed at the primary processing step 255 it is split into three identical signals or outputs. Many more than three identical signals are contemplated. A first one of these signals is then processed again 260 in a secondary processing means. It may also have its gain manipulated. A second one of these is then processed again 265 in a secondary processing means. It may also have its gain manipulated.

Finally, one of the identical signals has only its gain manipulated in step 270.

Each of these three identical signals are also used in a separate output channel G, H, I.

In the first output channel G, the output from the secondary processing step 210 of the first input signal E is sent to a tertiary processing step 280 where it is combined with the output from the secondary processing step 260 of the second input signal F. This tertiary processing step 280 may be effected by a tertiary processing means. The overall characteristics of the combined signal may be manipulated. Its gain may be also be manipulated. The resultant output is known as an auxiliary output mix J.

In the second output channel H, the output from the secondary processing step 215 of the first input signal E is sent to a tertiary processing step 290 where it is combined with the output from the secondary processing step 265 of the second input signal F. This tertiary processing step 290 may be effected by a tertiary processing means. The overall characteristics of the combined signal may be manipulated. Its gain may be also be manipulated. The resultant output is known as an auxiliary output mix K.

In this way, each of the auxiliary output mixes J, K may have different characteristics from one another. Also any of the input signals E, F, combined into each auxiliary output mix J, K, may have different characteristics (other than their gain) from the same input signal when combined into a different auxiliary output mix. Furthermore, each auxiliary output may include a combination of input signals different from the combination in another auxiliary output mix. This allows flexibility in the system without the need for numerous input channels.

It is contemplated that there may be more than two output channels creating auxiliary output mixes and in this case the input signals would be split into more than three identical signals from the primary processing steps 205, 255.

In the last output channel I, the output from the gain manipulation step 220 of the first input signal E is sent to a tertiary processing step 300 where it is combined with the output from the gain manipulation step 270 of the second input signal F. This tertiary processing step 300 may be effected by a tertiary processing means. The overall characteristics of the combined signal may be manipulated. Its gain may be also be manipulated. The resultant output is known as a master output mix.

In the third output channel I it is contemplated that it may be possible to include secondary processing steps in the gain manipulation steps 220, 270 in a similar manner to those in the first two output channels G, H.

It is conceivable that the primary processing steps 205, 255 make no changes to the characteristics of the input signals and that the input signals are merely split into at least three identical output signals. In this case, each signal may well need additional processing at the secondary processing steps 210, 215, 260, 265 and possibly at the gain manipulation steps 220, 270.

The secondary processing steps 210, 215, 260, 265 may be known as "nodal processing steps".

The invention claimed is:

1. An audio mixing console comprising: first and second audio input channels each input channel comprising a receiver arranged to receive a unique audio input signal; the first input channel comprising a first primary processor for initially processing the input signal and arranged to provide at least three first identical output signals; the second input channel comprising a second primary processor for initially processing the input signal and arranged to provide at least three second identical output signals; the console further comprising at least three output channels; the first output channel comprising at least a first and second secondary processor, the first secondary processor arranged to process the first output signal from the first input channel and produce a first tertiary output signal; the second secondary processor arranged to process the first output signal from the second input channel and produce a second tertiary output signal; the second output channel comprising at least a third and fourth secondary processor, the third secondary processor arranged to process the second output signal from the first input channel and produce a third tertiary output signal; the fourth secondary processor arranged to process the second output signal from the second input channel and produce a fourth tertiary output signal; each output channel comprising a tertiary processor, the tertiary processor in the first output channel being arranged to combine and process the first and second tertiary output signals to produce a first auxiliary audio output mix; the tertiary processor in the second output channel being arranged to combine and process the third and fourth tertiary output signals to produce a second auxiliary audio output mix; and the tertiary processor in the third output channel being arranged to combine and process the third output from the first input channel and the third output from the second input channel to produce a master audio output mix; wherein the processors are arranged to perform customized processing of each respective output signal pursuant to user preference such that the characteristics of the master audio output mix, the first auxiliary audio output mix and the second auxiliary audio output mix are all different from one another.

2. The audio mixing console according to claim 1, wherein the third output channel further comprises controls for adjusting the gain of the third output from the first input channel and the third output from the second input channel prior to their being combined and processed by the tertiary processor.

3. The audio mixing console according to claim 2, wherein the controls for adjusting the gain of the third output from the first input channel and the third output from the second input channel, prior to their being combined and processed by the tertiary processor, also includes fifth secondary processor for processing the third output from the first input channel and sixth secondary processor for processing the third output from the second input channel.

4. The audio mixing console according to claim 1, wherein any, or all, of the secondary processors are arranged for adjusting the gain and processing the other characteristics of the first and/or second output signals.

5. The audio mixing console according to claim 1, wherein the primary processors are arranged to process any of the characteristics of the input signals other than their gain.

6. The audio mixing console according to claim 1, wherein any or all of the processors are provided by a set of processors, comprising one or more processors.

7. The audio mixing console according to claim 1, further comprising manually operable controls for controlling the processing and combining of the input signal(s) and for directing the master output mix and auxiliary output mix to different destinations.

8. The audio mixing console according to claim 7, further comprising a memory for storing and recalling the settings of the manually operable controls.

9. The audio mixing console according to claim 8, wherein the memory is arranged to store more than one set of settings.

10. The audio mixing console according to claim 1, wherein the processor is configured to be able to independently, or in combination, apply processes selected from the group including: attenuation; band curve selection; band-pass equalization; boosting; compression; delaying; valve emulation; dual insert points; dynamic equalisation; dynamic reshaping; echoing; equalization; fading; four-band parametric equalization; gating; high-pass equalization; high-pass filtration; level fluctuating; levelling; low-pass filtering; low-pass equalization; mixing; notch filter equalization; panning; reshaping; reverberation; shelf equalization; single and multi-channel pre-setting; and summing.

11. The audio mixing console according to claim 1, further comprising an indicator.

12. The audio mixing console according to claim 11, wherein the indicator comprises visual indicators and/or audio indicators.

13. The audio mixing console according to claim 11, wherein the indicator comprises one or more of a light, LED, VDU, headphones, speaker, monitor, whistle, bell and chime.

14. The audio mixing console according to claim 1, wherein the input signals comprise one or more of an instrument, vocals, a sample, a recording and other sound sources.

15. A method of processing audio input signals comprising the steps of providing an audio mixing console according to claim 1, providing at least two audio input signals, and processing them simultaneously in different ways to create at least three first and at least three second output signals, further processing at least two of the at least three first and at least three second output signals pursuant to user preference to create tertiary output signals each tertiary output signal having characteristics, other than its gain, different from one another, and combining and processing at least two tertiary output signals to create a first auxiliary audio output mix, and combining and processing at least two other tertiary output signals to create a second auxiliary audio output mix, and combining and processing a first and second output signal to create a master audio output mix.

\* \* \* \* \*